3,092,324
Patented June 4, 1963

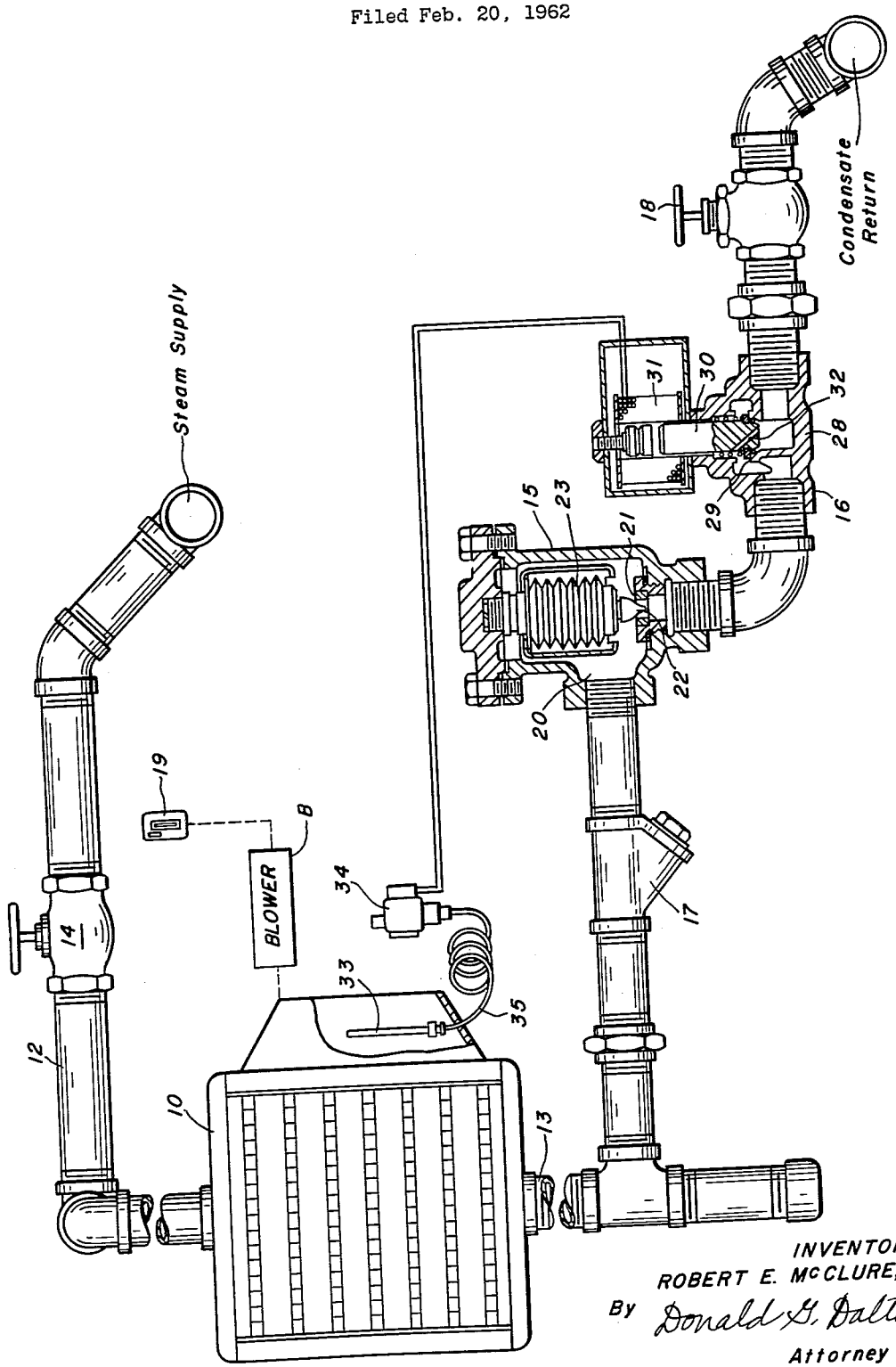

3,092,324
MECHANISM FOR PREVENTING LOSS OF STEAM FROM A SPACE HEATER
Robert E. McClure, Jr., Mount Lebanon, Pa., assignor to United States Steel Corporation, a corporation of New Jersey
Filed Feb. 20, 1962, Ser. No. 174,559
6 Claims. (Cl. 237—9)

This invention relates to an improved mechanism for preventing loss of steam from a steam space heater.

Conventionally a steam space heating installation includes a return pipe for condensate which forms as the heater operates. This pipe is equipped with a trap which contains an orifice and a valve for opening and closing the orifice as the temperature rises and falls and thus limiting return of live steam along with condensate. The volume of returning condensate varies as the heater operates at different percentages of its rated capacity. For example, if the heater is turned on when the surrounding temperature is 40° F., and a temperature of 70° F. is desired, the heater may operate for a time at a rate approaching its maximum and produce a relatively large volume of condensate. As the surrounding temperature approaches 70° F., the heater operates at progressively lower rates and produces diminishing volumes of condensate. The trap orifice must be sufficiently large to pass the volume of condensate produced at the maximum operating rate. Hence when the heater operates at lower rates, the orifice is larger than necessary for passing the condensate and allows a wasteful leakage of live steam.

An object of the present invention is to provide, in a steam space heating installation, a mechanism which automatically regulates the effective orifice opening in the return pipe in accordance with the operating rate, thereby preventing waste of live steam.

A more specific object is to provide, in a return pipe from a steam space heater, a valve which automatically closes when the heater operates at low rates and acts as a secondary orifice to prevent waste of live steam through the larger orifice in the trap.

In the drawing:

The single FIGURE is a diagrammatic view of a steam space heating installation, the return pipe of which is equipped with my regulating mechanism.

The drawing shows a conventional steam space heater 10 and inlet and return pipes 12 and 13 connected to the upper and lower ends thereof. Pipe 12 comes from a suitable supply of live steam (not shown) and it contains a shut-off valve 14. Pipe 13 leads back to the supply or to a drain, and it contains a conventional trap 15 and a valve 16 in series with the trap arranged in accordance with my invention. Pipe 13 may also contain a conventional strainer 17 and another shut-off valve 18. The heater is equipped with the usual blower which is indicated diagrammatically at B and is controlled by a conventional modulating-type room thermostat 19. When the surrounding temperature drops below the value for which the thermostat is set, the blower operates to blow air over the heater. Otherwise the blower does not operate.

As shown diagrammatically in the drawing, trap 15 includes a chamber 20, an orifice plate 21, a needle valve 22 for opening and closing the orifice, and a temperature-sensitive element 23 for operating the valve in accordance with the trap temperature. I have illustrated a bellows for operating the valve, but other means, such as a bi-metallic strip, would be equivalent. When the heater is first started, the trap ordinarily is cool and its orifice closed. Steam enters the heater and condenses. The resulting condensate flows through pipe 13 into the trap, where it collects in chamber 20. After a time the trap temperature rises sufficiently that the bellows 23 operates valve 22 to open the orifice. Condensate now flows back to the source or drain. The orifice must be sufficiently large to allow condensate to pass at a rate at least as great as it forms; otherwise the heater would soon fill with water. As the surrounding air approaches the desired temperature, the blower operates intermittently, and valve 22 periodically opens and closes the orifice. During such operation the orifice is unnecessarily large, and tends to allow escape of live steam each time it opens to discharge condensate.

The purpose of valve 16 is to prevent loss of live steam through the trap. As the drawing shows, the valve includes a housing 28, a seat 29 formed in said housing, a reciprocable closure member 30 in said housing, and a solenoid 31 for operating the closure member. In the valve illustrated, the closure member engages the seat when the solenoid is deenergized, but it is apparent I could use a valve which operates the other way with appropriate changes in the circuit hereinafter described. A small bore or secondary orifice 32 in the closure member permits condensate to discharge through the valve when the closure member is seated against seat 29. The cross-sectional area of orifice 32 is substantially smaller than that of the trap orifice. I place a thermostat 33 where it is subject to the temperature of air going into the heater. I connect a conventional bellows-actuated mercury switch 34 to this thermostat via a copper tubing 35, and connect the switch electrically to the solenoid. I adjust thermostat 33 to close switch 34 when the temperature of air reaching the heater drops three or four degrees below the temperature I desire to maintain.

As long as switch 34 is open, solenoid 31 is deenergized and the closure member 30 of valve 16 is seated. Orifice 32 in the closure member effectively limits flow of condensate and live steam through the return pipe 18. Orifice 32 controls, rather than the larger orifice in trap 15. When the temperature of the incoming air is below the value for which thermostat 33 is set, switch 34 closes, whereupon the solenoid is energized to open the closure member 30. The passage through valve 16 becomes larger than the trap orifice, and the latter now controls. Thus the trap can perform its usual function as long as the heater operates at a relatively high rate.

From the foregoing description, it is seen that my invention affords a simple regulating mechanism for conserving steam used in a space heater without in any way interfering with normal operation of the heater. In operating a steam space heater which has a basic rating of 3,000,000 B.t.u./hour, I estimate my mechanism lowers the live steam loss by approximately 150 pounds an hour.

While I have shown and described only a single embodiment of my invention, it is apparent that modifications may arise. Therefore, I do not wish to be limited to the disclosure set forth but only by the scope of the appended claims.

I claim:

1. In a space heating installation which includes a steam heater, inlet and return pipes connected to said heater, and a trap in said return pipe providing an orifice to limit flow of condensate and live steam therethrough, the combination therewith of a mechanism for further preventing loss of live steam, said mechanism comprising a valve in said return pipe in series with said trap, said valve when closed providing an orifice of smaller cross-sectional area than the orifice in said trap and when open providing a passage of greater cross-sectional area than the orifice in said trap, and operating means for said valve for opening it when the air temperature adjacent the heater drops below a predetermined value and closing it when the temperature rises above a predetermined value.

2. In a space heating installation which includes a steam heater, inlet and return pipes connected to said heater, and a trap in said return pipe providing an orifice to limit flow of condensate and live steam therethrough, the combination therewith of a mechanism for further preventing loss of live steam through said trap, said mechanism comprising a valve in said return pipe in series with said trap, said valve when closed providing an orifice of smaller cross-sectional area than the orifice in said trap and when open providing a passage of greater cross-sectional area than the orifice in said trap, operating means connected to said valve for opening and closing it, and temperature-responsive means operatively connected with said operating means for actuating it to open said valve when the air temperature adjacent said heater drops below a predetermined value and to close said valve when the temperature rises above a predetermined value.

3. In a space heating installation which includes a steam heater, inlet and return pipes connected to said heater, and a trap in said return pipe providing an orifice to limit flow of condensate and live steam therethrough, the combination therewith of a mechanism for further preventing loss of live steam through said trap, said mechanism comprising a valve in said return pipe in series with said trap, said valve having a seat and a reciprocable closure member adapted to engage said seat, said closure member providing an orifice of smaller cross-sectional area than the orifice in said trap and being effective to limit flow through said return pipe when said closure member engages said seat, said valve providing a passage of greater cross-sectional area than the orifice in said trap when said closure member is unseated, an operating solenoid connected with said closure member, and temperature responsive means operatively connected with said solenoid for operating the solenoid to unseat said closure member when the air temperature adjacent said heater drops below a predetermined value and operating the solenoid to engage said closure member with said seat when the temperature rises above a predetermined value.

4. In a space heating installation which includes a steam heater, inlet and return pipes connected to said heater, a trap in said return pipe providing an orifice to limit flow of condensate and live steam therethrough, a blower for blowing air over said heater, and a room thermostat operatively connected with said blower, the combination therewith of a mechanism for further preventing loss of live steam through said trap, said mechanism comprising a valve in said return pipe in series with said trap, said valve when closed providing an orifice of smaller cross-sectional area than the orifice in said trap and when open providing a passage of greater cross-sectional area than the orifice in said trap, and operating means for said valve subject to the temperature of air going into the heater for opening the valve when this temperature drops below a predetermined value and closing it when the temperature rises above a predetermined value.

5. In a space heating installation which includes a steam heater, inlet and return pipes connected to said heater, a trap in said return pipe providing an orifice to limit flow of condensate and live steam therethrough, a blower for blowing air over said heater, and a room thermostat operatively connected with said blower, the combination therewith of a mechanism for further preventing loss of live steam through said trap, said mechanism comprising a valve in said return pipe in series with said trap, said valve when closed providing an orifice of smaller cross-sectional area than the orifice in said trap and when open providing a passage of greater cross-sectional area than the orifice in said trap, operating means connected to said valve for opening and closing it, and temperature-responsive means in a location subject to the temperature of air going into the heater and operatively connected with said operating means for actuating it to open said valve when this temperature drops belw a predetermined value and to close said vale when the temperature rises above a predetermined value.

6. In a space heating installation which includes a steam heater, inlet and return pipes connected to said heater, a trap in said return pipe providing an orifice to limit flow of condensate and live steam therethrough, a blower for blowing air over said heater, and a room thermostat operatively connected with said blower, the combination therewith of a mechanism for further preventing loss of live steam through said trap, said mechanism comprising a valve in said return pipe in series with said trap, said valve having a seat and a reciprocable closure member adapted to engage said seat, said closure member providing an orifice of smaller cross-sectional area than the orifice in said trap and being effective to limit flow through said return pipe when said closure member engages said seat, said valve providing a passage of greater cross-sectional area than the orifice in said trap when said closure member is unseated, an operating solenoid connected with said closure member, and temperature responsive means in a location subject to the temperature of air going into the heater and operatively connected with said solenoid for operating the solenoid to unseat said closure member when this temperature drops below a predetermined value and operating the solenoid to engage said closure member with the seat when the temperature rises above a predetermined value.

References Cited in the file of this patent
UNITED STATES PATENTS

| 2,307,723 | Anderson | Jan. 5, 1943 |
| 2,411,731 | Jones | Nov. 26, 1946 |

FOREIGN PATENTS

| 339,951 | Germany | Aug. 25, 1921 |